March 20, 1962  W. KADEN ET AL  3,025,752
CONTROL DEVICE FOR A MOTION PICTURE CAMERA
Filed Dec. 3, 1958  2 Sheets-Sheet 1

INVENTORS:
WILLY KADEN
ERICH FILSINGER
BY Connolly and Hutz
THEIR ATTORNEYS

March 20, 1962 W. KADEN ET AL 3,025,752
CONTROL DEVICE FOR A MOTION PICTURE CAMERA
Filed Dec. 3, 1958 2 Sheets-Sheet 2
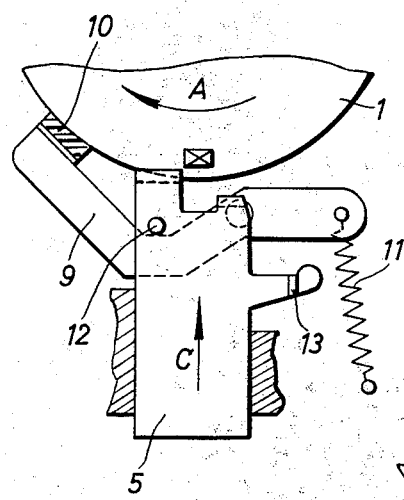
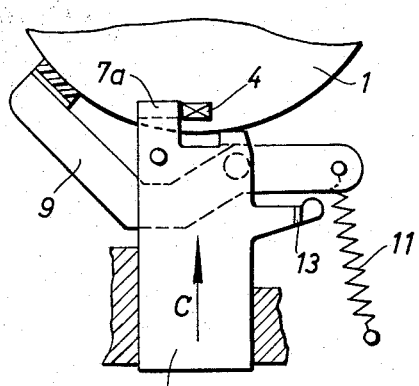
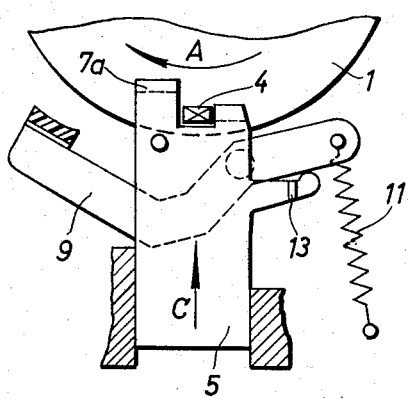
INVENTORS
WILLY KADEN
BY ERICH FILSINGER
Connolly and Hutz
THEIR ATTORNEYS

United States Patent Office 3,025,752
Patented Mar. 20, 1962

3,025,752
CONTROL DEVICE FOR A MOTION PICTURE CAMERA
Willy Kaden and Erich Filsinger, Munich, Germany, assignors to Agfa Aktiengesellschaft, Leverkusen, Bayerwerk, Germany, a corporation of Germany
Filed Dec. 3, 1958, Ser. No. 777,941
Claims priority, application Germany Dec. 13, 1957
7 Claims. (Cl. 88—17)

This invention relates to a control device for a motion picture camera having a rotary shutter, and more particularly relates to such a device for controlling the operation of the rotary shutter.

A rotary shutter for a motion picture camera has various modes of operation. It rotates freely for taking moving pictures. It rotates through single revolutions for shooting single frames, and it is stopped entirely in the off-position. When a rotary shutter such as a rotating disc, is suddenly stopped, the shutter and control device are unduly shocked and stressed. This disadvantage is particularly evident when the shutter is stopped while it is rotating at a high picture taking frequency.

An object of this invention is to provide a control device for a motion picture camera having a rotary shutter which operates without shocking the shutter or control device itself.

Another object is to provide such a device which is simple and economical to manufacture and assemble.

In accordance with this invention, a shock-free control device for a motion picture camera having a rotary shutter is provided by operatively associating a braking device with the operating element which controls the operation of the rotary shutter. This braking device is for example preferably constructed as a brake shoe which reacts upon the periphery of the shutter disc. It is advantageously mounted upon a lever which is rotatably mounted upon a stationary pin. A spring may react against the lever in a direction to press the shoe against a peripheral surface of the shutter disc.

In accordance with a more detailed aspect of this invention the brake lever and a shifting element which is for example a slide, are mounted in parallel planes, and the slide is, for example, arranged to move in a radial direction relative to the axis of rotation of the shutter disc. This slide is connected to the lever by projection means, for example, to cause the brake lever and shoe to be retracted from the shutter disc when the slide is pulled back thereby permitting the disc to rotate freely for taking moving pictures. This arrangement may also include the advantageous feature of a projection on the front end of the slide which optionally engages a stop rigidly mounted on the shutter disc. Also, an ear extends from the side of the slide for contacting one arm of the brake lever to retract it when the slide is moved to the extreme forward position for shooting single frames. In this single-shot position the brake lever is accordingly retracted from contact with the edge of the shutter disc as long as the slide is held in the extreme forward position. When the slide is released the spring reacting against the lever automatically moves the slide back from the single-shot position to the off position.

This invention accordingly provides the advantage of stopping the shutter disc only after its motion is retarded by the brake thereby minimizing the shock applied to the shutter and slide and preventing the occurrence of sharp blows. This minimizes the stresses applied to the aforementioned parts and results in unexpectedly smooth operation of the camera.

Novel features and advantages of the present invention will become apparent to one skilled in the art from a reading of the following description in conjunction with the accompanying drawings wherein similar reference characters refer to similar parts and in which:

FIG. 3 is a front view in elevation of a portion of the embodiment shown in FIG. 1 in the braking position;

FIG. 4 is a front view in elevation of a portion of the embodiment shown in FIG. 1 in the stop position; and FIG. 5 is a front view in elevation of a portion of the embodiment shown in FIG. 1 in the single-shot position.

Figure 1:
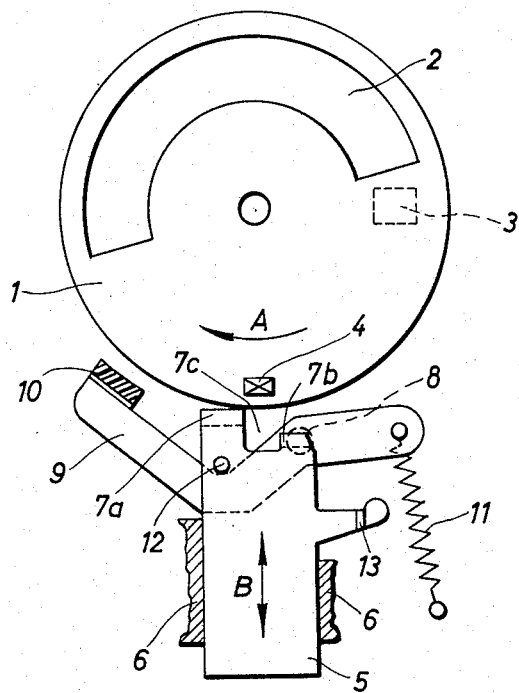
FIG. 1 is a front view in elevation of one embodiment of this invention in the moving picture-taking position.
Figure 2:
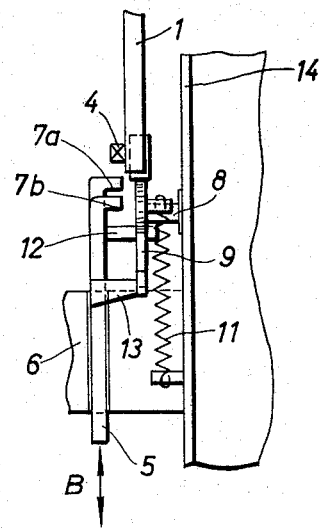
FIG. 2 is a side view in elevation of the embodiment shown in FIG. 1.

In FIGS. 1 and 2 is shown a rotary shutter disc 1, having a ring-shaped slot 2, which traverses an aperture 3 in the wall of a camera housing (not shown). Light rays intermittently pass through aperture 3 and slot 2 to expose the film. A stop 4 is rigidly mounted, for example, upon shutter disc 1 adjacent its edge, and the direction of rotation of disc 1 is indicated by the arrow "A." The control or shifting device which cooperates with shutter disc 1, includes for example a control or shifting slide element 5, which is mounted to move within guide channel 6 forward and backward in the directions indicated by double-headed arrow "B." Guide channel 6 is mounted upon the camera housing in a disposition which allows slide 5 to move in a direction which is substantially radial to the axis of rotation of shutter disc 1. The front end of slide 5 which is adjacent to the edge of disc 1 includes for example a pair of projections 7a and 7b which are, for example, made in the form of two rectangular lugs. These lugs are, for example, provided by bending separate extensions of the front end of slide 5 perpendicular to slide 5 and towards disc 1. Lugs 7a and 7b are long enough to allow either of them to be alternately interposed into the path of motion of stop 4 on disc 1. The radial distance between lugs 7a and 7b is so proportioned that stop 4 cannot pass between them when slide 5 is accordingly adjusted. The lateral space between the lugs 7a and 7b is larger than the length of the stop 4. A recess 7c is cut in the forward end of slide 5 between lugs 7a and 7b.

A two-armed brake lever 9 is rotatably mounted upon a shaft 8 which is, for example, rigidly mounted upon a stationary portion of the camera housing represented by frame 14 shown in FIG. 2. This lever is mounted adjacent the forward end of slide 5; and is, for example, substantially in the same plane as shutter disc 1. A braking element 10 which is, for example, a brake shoe is mounted upon one end of lever 9; and it is arranged to contact a peripheral surface or edge of disc 1 in the braking positions illustrated in FIGS. 3 and 4. Resilient means 11 which is, for example, a tension spring reacts upon the other end of lever 9 to urge lever 9 into the braking position. Brake shoe 10 is carried upon one arm of lever 9. Lever 9 is constructed and arranged to include an indentation which is contacted by a projection, such as pin 12 upon slide 5. When slide 5 is pulled in a backward direction, pin 12 contacts the indentation formed by the crook in lever 9 and moves the crooked arm of lever 9 along with it away from disc 1. This moves brake shoe 10 away from and out of contact with shutter disc 1. As slide 5 moves away from brake disc 1, lugs 7a simultaneously moves away from stop 4 thereby permitting disc 1 to rotate freely. This free rotating position shown in FIG. 1 is utilized for taking moving pictures.

When the shooting of motion pictures is to be interrupted or stopped, slide 5 is moved in the direction of the arrow "C" shown in Fig. 3. Pin 12 thereby releases brake lever 9, and tension spring 11 reacts against it to move brake shoe 10 into forceful contact with the peripheral surface of disc 1. The rotational motion of disc 1 is thereby smoothly braked and retarded. When slide 5 is moved a little further in the forward direction as shown in Fig. 4, lug 7a moves into the path of stop 4 and arrests it to positively stop the rotation of disc 1.

When single frames of film are to be shot, slide 5 is pushed into the extreme forward position shown in Fig. 5, ear 13 extending from the side of slide 5 is then pressed into contact with the adjacent arm of brake lever 9 to rotate brake shoe 10 out of contact with disc 1. At the same time lug 7a moves past stop 4 and allows it to rotate past it thereby also allowing disc 1 to rotate. However, disc 1 only rotates through one revolution even if slide 5 is maintained in the extreme forward position shown in Fig. 5 because stop 4 is arrested by the outer side of lug 7b. When slide 5 is thereafter released, stop 4 is arrested on the inner surface of lug 7a which is automatically moved back into the stop position shown in Fig. 4 by the reaction of tension spring 11 indirectly upon ear 13 of slide 5 through the adjacent arm of lever 9.

What is claimed is:

1. A control device for a motion picture camera having a rotary shutter comprising a rotary shutter disc, a control slide movably mounted adjacent said shutter disc, said control slide and shutter disc having cooperative projection means for optionally arresting and permitting movement of said disc, a braking lever movably mounted adjacent said slide and said shutter disc, said braking lever including a braking surface constructed and arranged for engaging said disc to retain its motion, a spring reacting against said braking lever in a direction to force said braking surface against said peripheral surface of said shutter disc, and projecting means extending from said slide which contacts said braking lever when said slide is moved away from said disc for causing said braking surface to be retracted from said disc when said slide is pulled away from said disc and for allowing said braking surface to engage said disc to retard its motion when said slide is moved towards the position in which it arrests rotation of said disc.

2. A control device as set forth in claim 1 wherein said braking surface is provided by a brake shoe which engages a peripheral surface of said disc.

3. A control device as set forth in claim 1 wherein said braking lever and said slide are disposed in parallel planes, said slide being adjustably mounted to move in a direction radial to the axis of the rotation of said shutter disc, and said projecting means includes a pin mounted upon said slide which contacts said braking lever when said slide is moved away from said disc to disengage said braking element from said disc.

4. A control device as set forth in claim 3 wherein said braking lever is rotatably mounted upon a pivot intermediate its ends, said pin contacts said lever upon one side of said pivot for disengaging said braking lever from said disc, and said slide includes an extension which contacts said lever on the other side of said pivot to disengage said braking lever from said disc when said slide is moved toward said disc to an extreme forward position.

5. A control device as set forth in claim 4 wherein a stop is mounted on said disc, said slide includes a pair of lugs extending therefrom into the path of motion of said stop, said lugs being disposed at varying radial distances from the axis of rotation of said disc to permit the outermost lug to be interposed into the path of said stop for arresting the movement of said shutter disc in the stop position, and the innermost lug extending forward a sufficient distance to arrest said stop after a single revolution past said outermost lug when said outermost lug is moved radially inside and clear of said stop to said extreme forward position.

6. A control device as set forth in claim 5 wherein said lugs are laterally spaced from each other a distance sufficient to permit said stop to move between them while said outermost lug is moved radially inside and clear of said stop.

7. A control device for a motion picture camera having a rotary shutter comprising a rotary shutter disc, a control slide movably mounted adjacent said shutter disc, said control slide and shutter disc having cooperative projection means for optionally arresting and permitting movement of said disc, a braking lever movably mounted adjacent said slide and said shutter disc, said braking element including a brake shoe which engages a peripheral surface of said disc to retard its motion, coupling means operatively associating said slide with said braking lever for causing said brake shoe to engage said disc to retard its motion when said slide is moved towards the position in which it arrests rotation of said disc, said lever being rotatably mounted upon a stationary shaft, a spring reacting against said braking lever in a direction to force said brake shoe against said peripheral surface of said shutter disc, said braking lever and said slide being disposed in parallel planes, said slide being adjustably mounted to move in a direction radial to the axis of the rotation of said shutter disc, said coupling means including a pin mounted upon said slide which contacts said braking lever when said slide is moved away from said disc to disengage said braking lever from said disc, a stop projection being mounted upon said disc, said slide including a pair of lugs extending therefrom into the path of motion of said stop, said lugs being disposed at varying radial distances from the axis of rotation of said disc, said slide being movable to varying radial dispositions with respect to the axis of rotation of said disc to permit its outermost lug to be interposed into the path of said stop for arresting the movement of said shutter disc in the stop position, said lugs being laterally spaced from each other to permit said slide to be moved toward said disc to a single-shot position in which said outermost lug moves radially inside and clear of the path of said stop thereby permitting said stop to rotate past said outermost lug, said innermost lug extending forward a sufficient distance to arrest said stop after a single revolution past said outermost lug when said slide is moved to said single-shot position from said stop position, said slide including a projection which engages said braking lever to rotate it away from said disc when said slide is moved into said single-shot position from said stop position, and said spring reacting against said brake lever causing said slide to automatically move back from said single-shot position to said stop position when said slide is released.

References Cited in the file of this patent

UNITED STATES PATENTS

| 1,758,221 | De Vry | May 13, 1930 |
| 1,977,134 | Lingg et al. | Oct. 16, 1934 |
| 2,148,934 | Frankel | Feb. 28, 1939 |

FOREIGN PATENTS

| 419,403 | Germany | Oct. 5, 1925 |
| 604,323 | Germany | Oct. 18, 1934 |
| 448,367 | Italy | May 16, 1949 |
| 598,967 | Great Britain | Apr. 28, 1948 |